United States Patent [19]

Rockwell

[11] 4,126,994
[45] Nov. 28, 1978

[54] FLUID MOTOR AND CONTROL

[75] Inventor: Harvey M. Rockwell, Springfield, Ill.

[73] Assignee: Fiat-Allis Construction Machinery, Inc., Deerfield, Ill.

[21] Appl. No.: 820,550

[22] Filed: Aug. 1, 1977

[51] Int. Cl.² ............................................... F15B 11/16
[52] U.S. Cl. .................................... 60/420; 60/445; 60/484; 74/664; 91/492; 180/6.48
[58] Field of Search ............... 60/420, 431, 433, 434, 60/443, 445, 451, 484, 487; 91/492; 180/6.48; 74/664

[56] References Cited

U.S. PATENT DOCUMENTS

| | | | |
|---|---|---|---|
| 3,404,584 | 10/1968 | Trautmann | 60/487 X |
| 3,848,690 | 11/1974 | Hawkins | 180/6.48 |
| 3,876,020 | 4/1975 | Barsby | 180/6.48 |
| 3,886,741 | 6/1975 | Ward | 60/431 |
| 3,975,988 | 8/1976 | Eickmann | 91/492 |

*Primary Examiner*—Edgar W. Geoghegan
*Attorney, Agent, or Firm*—August E. Roehrig, Jr.; Robert A. Brown

[57] ABSTRACT

A hydrostatic vehicle transmission and control for automatically controlling vehicle operation in accordance with pre-selected operator settings. The hydrostatic transmission automatically adjusts to operational conditions of the vehicle to obtain the pre-selected function and automatically adjusts the vehicle transmission until the preselected operational conditions can be obtained.

26 Claims, 7 Drawing Figures

FLUID MOTOR AND CONTROL

BACKGROUND OF THE INVENTION

The present invention relates generally to fluid motors and fluid motor controls and more particularly, to hydrostatic vehicle transmissions which include a fluid pump, a fluid motor, and a control system which enables the speed and direction of the motor to be controlled, which permits the motor to receive an operator-selected output speed setting, which also permits variation of the motor torque and speed to be automatically controlled so as to approach the desired output settings in a highly effective and efficient manner.

In one form, the control system of the invention permits a cam ring or like torque-determining member of the hydrostatic motor to be moved to a desired position as rapidly as operating conditions permit, and permits this position to be maintained during normal vehicle operation. The motor torque automatically adjusts to operating condition demand and the rotational speed is controlled so that the vehicle will maintain a preselected speed set by the operator, if conditions permit; otherwise, the motor will adjust itself so as to attempt to approach and maintain this speed, even where this involves automatically adjusting its displacement to reverse motor torque or so-called dynamic braking.

Hydrostatic drives or transmissions are now commonly used in a number of vehicles, including some applications in heavy duty crawler tractors and the like. In a hydrostatic system typically employed, the vehicle engine, ordinarily a diesel or gasoline engine, drives a primary fluid pump unit of the variable displacement type.

A fluid motor also of the variable displacement type is used in association with the variable displacement pump. The control means of the typical system usually produces coordinated movement of both pump and motor displacement controls. Initial motion strokes the pump from a zero displacement position toward a maximum foward or reverse displacement position depending on the vehicle travel direction and speed desired, thereby representing a first operating range. The motor which receives the pump fluid flow and pressure is initially in a maximum displacement condition thereby producing maximum torque through the speed range provided by the zero to maximum pump displacement change. A second operating range is provided in which the coordinated movement control strokes the motor from its normal maximum displacement toward a minimum displacement position. This maneuver further increases the vehicle speed and also reduces the torque output of the motor. The pump/motor stroke control is usually interconnected and manually operated for selecting the desired speed and torque to suit conditions under which the vehicle is operated.

The present invention also uses a variable displacement pump and motor; however, only the motor receives a manually initiated control movement. The pump is of the pressure compensated type well known in the hydrostatic power art in which a normal maximum displacement is automatically reduced toward zero at a predetermined maximum fluid pressure. A nearly constant predetermined pressure is therefore delivered to the motor and used at volume only sufficient to satisfy the combination of speed/torque demand by the motor in accordance with the control setting and vehicle operating conditions.

According to the present invention, the motor or driven portion of the transmission is a radial piston variable displacement type and includes a variable position cam ring in engagement with radially extending end portions of a plurality of pistons.

The fluid displacement caused by piston movement in each rotation is affected by the position of the motor cam ring which is movable within predetermined limits to either side of a center position at which there is no piston stroke and no motor torque. Changing the position of the cam ring to alter the displacement of the pistons for each revolution has been referred to as "stroking" the motor. It is to be understood that the motor will produce a displacement of no volume if the cam ring and the cylinder body containing the pistons are in exact co-axial relation, and that, as the cam ring is offset or disposed eccentrically with respect to the cylinder body, the fluid pressure acts on the pistons, which in turn, act on the cam rings to rotate the cylinder block.

The pressure compensated pump, which is associated with the vehicle engine, is arranged so that it will produce a volume of oil at a pressure up to a predetermined level. If the pump tends to exceed the predetermined output pressure, the internal pump controls are arranged so as to reduce the stroke of the pistons, therefore also reducing the volume output, to an extent sufficient to not exceed the preset pressure; hence, the term, pressure compensated. Somewhat similar considerations apply to the motor, which is essentially also a pump, except that it is normally operated so that it receives a flow of fluid under pressure and produces motion instead of receiving motion and producing a flow of fluid under pressure.

Again referring to a typical vehicle hydrostatic transmission, the engine throttle is positioned at a certain governed speed setting, the pump operates initially at zero displacement and pressure. The output volume of the pump is then selected by the operator within a first speed range and fluid is delivered to the vehicle motor. The driven element or hydrostatic motor receives fluid flow in a variably controlled amount and the power potential of this fluid flow may be translated into a large force or torque at a low rotational speed, or a relatively reduced force or torque at an increased rotational speed by varying the motor displacement.

Hydrostatic transmissions are desirable where load conditions may change continually and it is desired to operate the vehicle engine at a suitable point on its power curve; however, it is possible for the operator to manipulate the controls incorrectly so as to obtain too little vehicle speed, thus losing efficiency, or so as to obtain too much torque, thus overloading or even stalling the engine. Under a constantly changing load, the control lever must often be moved continually for optimum efficiency.

It may also be appreciated that a highly desirable advantage of hydrostatic transmissions, in contrast to hydrodynamic transmissions, is that the output may be readily reversed, simply by shifting of the cam ring or equivalent in the direction opposite the direction required to produce forward motion. In heavy duty equipment, such as earth-moving or other construction equipment where rearwardly directed tractive effort is often required, a significant variation in torque and speed potential in a reverse direction is highly desirable, particularly where this can be accomplished without resort to transmissions using multiple reverse gear sets.

From the foregoing, it will be appreciated that known hydrostatic transmissions have a number of theoretical advantages; however, such transmissions have suffered from certain drawbacks in use and are believed capable of significant further improvement, particularly in the area of motors and control systems therefor.

In view of the disadvantages and drawbacks of existing hydrostatic transmission and control systems, it is an object of the present invention to provide an improved hydrostatic transmission, components thereof, and controls therefor.

Another object is to provide a transmission system including a motor and control which provides variable speed and torque control in both directions of rotation, and which provides for the application of dynamic braking if the vehicle exceeds the speed selected by the operator.

A further object is to provide a transmission system which automatically adjusts the amount of fluid volume utilized at a predetermined pressure level and vehicle speed setting in response to load (vehicle tractive effort demand).

It is another object of the invention to provide a transmission control system in which the operator cannot cause excess power consumption and create excess fluid heating by stalling the vehicle in a condition requiring more torque at a higher speed setting than the traction motor can produce.

Still another object is to provide a transmission system wherein an "arterial" or closed center hydraulic system is used which makes fluid pressure available to perform multiple functions, and which is further arranged so that auxiliary functions may be performed even if full tractive effort is not available for propulsion purposes. In other words the auxiliary functions have priority over the vehicle propulsion function.

Yet another object is to provide a transmission system of reduced mechanical complexity, and particularly a system that does not require that variable displacement pumps and motors be constantly controlled and synchronized.

Another object is to provide a fluid motor with a greatly improved balance of static, dynamic and fluid pressure induced forces.

Still another object is to provide a motor control system which may be operated hydrostatically, electrically or mechanically, and which is useful with different prime power pressure sources and flow control arrangements.

Another object is to provide a transmission which includes a radial piston and cam ring type hydrostatic motor and drive arrangement, including a planetary gear set arranged so that the motor frame rotates about its own axis, carrying with it the cam ring control.

A further object is to provide a control system in which the cam ring control is carried by a rotatable motor frame and in which a cam ring movement is accomplished by rotation of a pinion gear about its own axis, and in which a variable speed arrangement is provided for exact control of cam ring position during rotation of the motor frame.

Another object is to provide a control system having means to prevent the traction motors from receiving an operator signal which, if obeyed, would cause an excessive lowering of hydraulic system pressure.

A still further object is to provide a vehicle control system which, in effect, provides a mechanical memory for the control signals given by the operator and which provides the most rapid response possible to such control signals without overloading the traction motor or causing an undue drop in hydraulic system pressure.

It is another object to provide an improved and highly effective system of pilot or feedback type control of a traction motor in a vehicle drive system by sensing the relation between tractive effort, hydraulic system pressure, and the positioning of the operator control lever.

Yet another object is to provide a transmission system in which the position of the output control for the traction motor is determined by a motor whose rotational speed is in turn controlled by a control pump, and wherein the control pump is responsive to instantaneous conditions of system pressure drop as well as the drive condition selected by the operator.

It is still another object to provide a transmission system in which a control means renders the vehicle propulsion drive function inoperative and hydrostatically locked if the system fluid pressure is below a predetermined safe operating level.

The foregoing and other objects and advantages are achieved in practice by providing a hydrostatic traction motor and control arrangement wherein the output of the traction motor is varied as desired by the operator, if tractive effort requirements are being met by the pump, and motor, and for preventing undue or extremely rapid movements of the traction motor output control where such movements would exceed the power capabilities of the drive system.

The exact manner in which these and other objects and advantages are achieved in practice will become more clearly apparent when reference is made to the following detailed description of the preferred embodiments of the invention set forth by way of example and shown in the accompanying drawings, in which like reference numbers indicate corresponding parts throughout.

DESCRIPTION OF THE DRAWINGS

Further objects of the invention, together with additional features contributing thereto and advantages accruing therefrom, will be apparent from the following description of a preferred embodiment of the invention which is shown in the accompanying drawings wherein like reference numerals indicate corresponding parts throughout, wherein.

DESCRIPTION OF THE PREFERRED EMBODIMENT OF THE INVENTION

Although the principles of the invention are applicable to various forms of hydraulic transmission and controls which differ from those referred to herein, a detailed description of one form of the invention will be made in which it is assumed that the driven vehicle is a crawler tractor or other large vehicle of the steering-by-driving type. The final drive of the vehicle is carried out by a shaft or other means secured to a rotatable flange driven by a rotatable traction motor assembly which includes a planetary gearset in which a planet carrier is the output drive member contiguously associated with a motor frame and in which the torque driving reaction is taken by a ring gear which is held stationary with relation to the tractor frame. The sun gear portion of the apparatus is geared or keyed for rotation with the piston and cylinder assembly of the rotatable hydraulic traction motor.

In the preferred form of invention, the shiftable eccentric member is a cam ring actuated by rack and pinion gearing, in which the motor frame carries the pinion gear portion, which serves to offset the cam ring in order to determine the direction of motor rotation and the torque developed by the motor. Accordingly, the control system includes a gear train arrangement in which, in stabilized operating conditions, the actuator for the pinion gear tends to rotate synchronously with the motor frame carrying the pinion gear, and wherein rotation of the pinion gear about its own axis, caused by slight differences in the rotation velocities of the motor frame and the control element, serve to reposition the cam rings for increased or decreased torque, or even to accomplish reversal of motor torque (dynamic braking).

According to the invention, synchronous rotation of the element which rotates the cam ring pinion gear is in turn accomplished by a pump and motor arrangement for controlling the stroke of the pistons in the traction motor. The output motor speed, and which in turn controls the initial position and maintenance of the motor torque setting, is itself ultimately determined by the preference of the operator, but is determined in the short run by transient conditions in the hydraulic system which indicate the extent to which the traction motor is meeting the tractive effort requirements of the vehicle.

In the preferred embodiment, the stroke control pump and motor just referred to are of the variable and fixed displacement type, respectively, the so-called stroke limiter, which serves to control the rate at which the cam ring may be moved, is in the form of a spring-biased piston actuated hydrostatically controlled unit.

When the pressure in the main hydraulic system indicating that the vehicle engine, pump and motor are able to meet the tractive effort demands of the vehicle, the so-called stroke limiter is virtually deactivated, and when system pressure drops below a predetermined value, changes in the cam ring setting which would produce an even greater pressure drop are not permitted, even though the operator may be signalling for such positions to take place by positioning the operator control lever. For the purpose of permitting the operator control lever to be placed and left in a speed setting which cannot be instantaneously obtained by the engine, pump and motor combination, a spring-loaded overtravel connection is placed in the linkage.

In the preferred form of motor, the cylinder block is of the double row radial piston type, and a cam ring is provided for each row of pistons. Other variable displacement hydrostatic motors, such as the parallel piston type may also be used.

Figure 1:
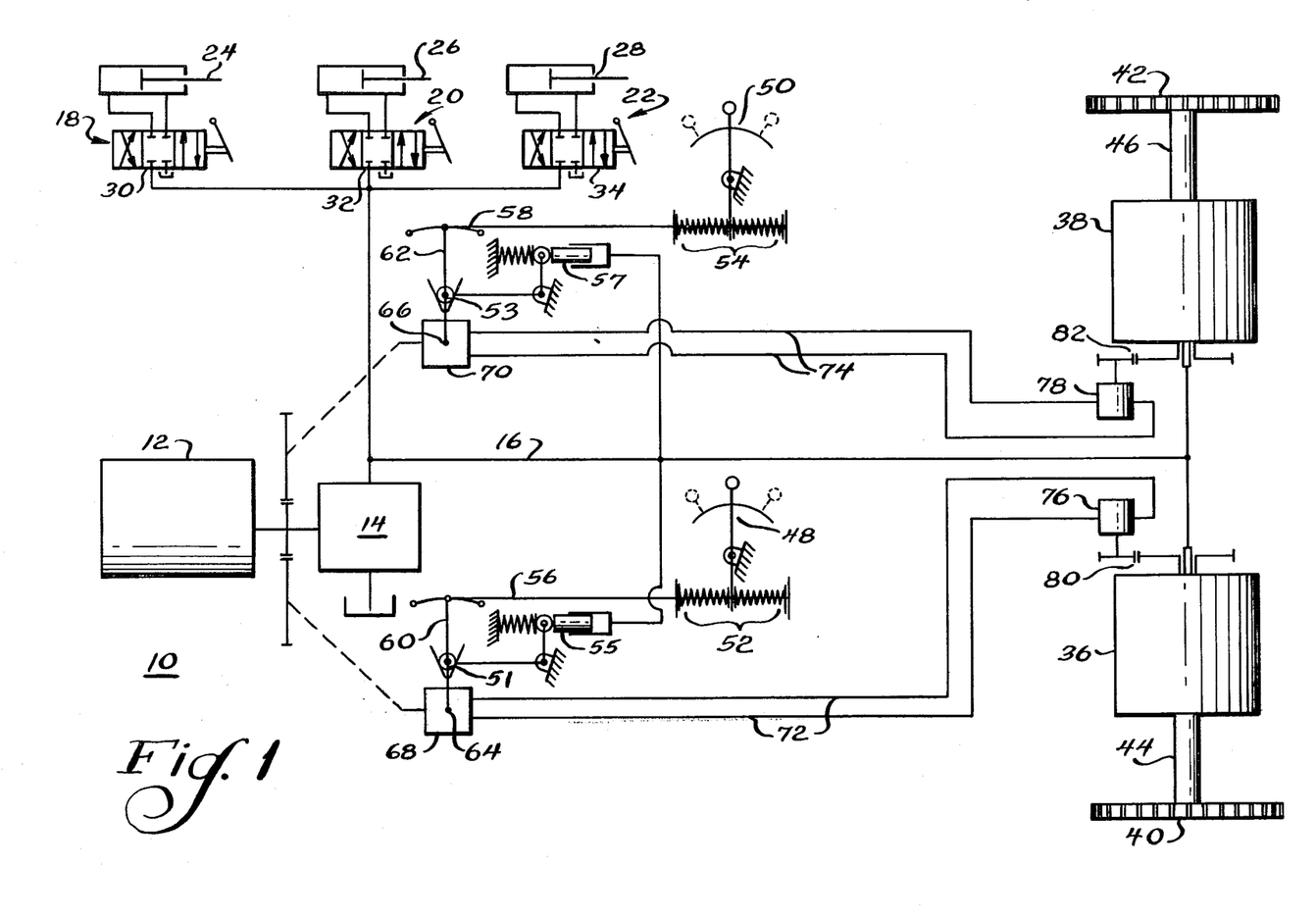
FIG. 1 is a diagramatic view showing the motor and control system of the invention to be embodied within a vehicle which includes a vehicle engine, a high pressure pump, a closed center auxiliary hydraulic system and two final drive motors, and showing the control system for the motors and the operative connection between the control system and the drive motors.

Referring now to the drawings in greater detail, in FIG. 1 there is shown a schematic or diagramatic view, generally designated 10 of the fluid motor and control system of the invention. This system includes a vehicle engine 12 drivingly connected to a constant pressure, variable displacement fluid pump 14 of a type known to those skilled in the art to be useful in hydrostatic systems. The so-called pressure compensated pump includes a high pressure outlet line 16 which supplies a plurality of closed center auxiliary function hydraulic systems 18, 20, 22, each of which may include a piston and cylinder assembly 24, 26, 28, and closed center hydraulic control valves 30, 32, 34, schematically represented by JIC symbols.

These piston and cylinder assemblies 24, 26, 28 are not essential to the practice of the invention; however, the control system of the invention, as will be pointed out hereinafter in addition to its other advantages, is further advantageous in that it permits these systems 18, 20, 22 which may be typically used to position the blade on a crawler tractor, for example, to receive hydraulic priority of operation with respect to final drive motors 36. These motors 36 are referred to herein as traction motors in view of their position and purpose, and to distinguish them from the various other hydraulic and electric motors referred to herein.

FIG. 1 also shows that the hydraulic line 16 is divided and piped so as to serve otherwise identical left and right hand fluid-operated traction motors 36, 38 each of which is adapted to drive a sprocket 40, 42 or other drive member through an intermediate drive means 44, 46. As is known to those skilled in the art, the drive means 44, 46 may comprise an extensive gear train, of the ring and pinion type, the planetary type, the chain and sprocket type, or otherwise, or may simply constitute an output shaft, depending on the application in which the unit is used.

FIG. 1 further shows a pair of operator hand control levers 48, 50, one such lever 48 being provided for the control of the left hand track and the other lever 50 for control of the right hand track. As is well known, these levers, in hydrostatic transmission vehicles, determine the intended direction and speed of the individual tracks, and, if operated together, the direction and speed of the vehicle. Each of the levers 48, 50 includes a spring-biased overtravel assembly 52, 54, a link 56, 58 connected at the end thereof to a stroke control lever 60, 62 which is pivotally attached, as at 64, 66, to a portion of a stroke control pump 68, 70. A pair of hydraulic lines 72, 74 connect the stroke control pump to a pair of stroke control motors 76, 78. These are schematically shown to be connected, as by means in the form of a chain or gear set 80, 82 to means (not shown in detail in FIG. 1) associated with the drive motors 36, 38 for positioning the cam rings or counterpart output control means thereof. A pair of yokes 51, 53 whose position is determined by the position of pistons 55, 57 and their associated parts act as hydraulically controlled means of limiting the rate at which the output of the stroke control pump may be changed and thus serves to limit, in some cases, the arcuate movement range of the stroking levers 60, 62 under conditions to be described.

Figure 2:
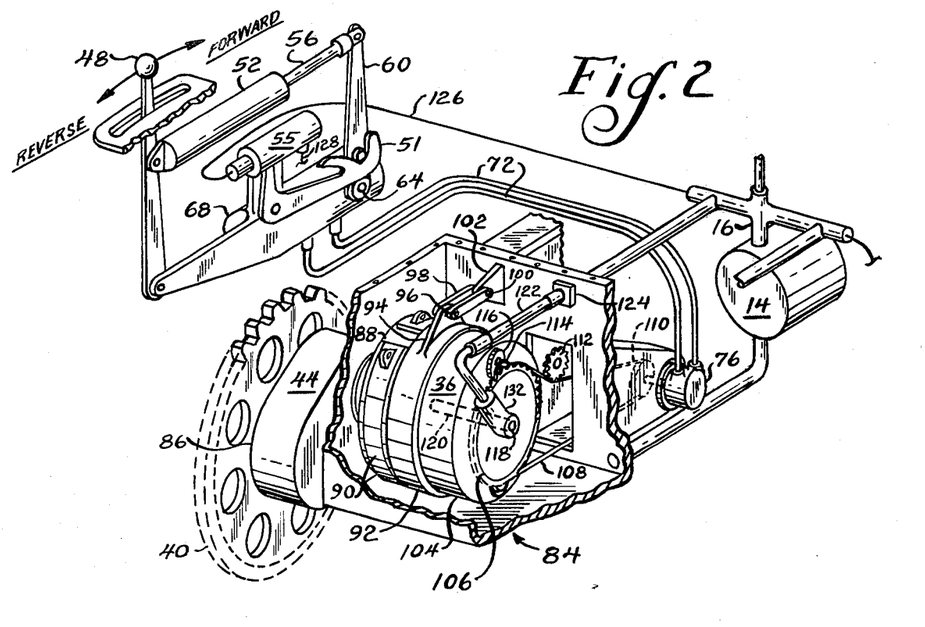
FIG. 2 is a perspective view, with parts broken away, showing the relation of the control system to the drive motor, and the relation of the drive motor components to the final vehicle drive.

Referring now to FIG. 2, a perspective view is shown of one form of drive assembly incorporating the motor and control system of the invention. Referring to the embodiments described in FIGS. 2-7, it will be understood that whereas the usual vehicle includes both left and right hand motors, controls, levers, etc., the units are identical, and therefore only one unit is shown and described in detail. FIG. 2 shows a driving assembly generally designated 84 to comprise a driven sprocket 40, which will be understood to be useful for driving the track of a tracked vehicle such as a crawler tractor or the like. A final drive housing 86 is shown associated with the sprocket 40. Such a housing 86 normally contains a gear or chain drive of a suitable type, the exact construction features of which are not important to the invention. Input to the members within the final drive housing 86 is made from the rotatable planet carrier drive flange 88 which is shown to be in the form of a drum, and which is preferably surrounded by a radially inwardly acting brake band 90 which may serve as a parking or emergency brake.

An annular ring gear 92 includes means in the form of a flange or ear 94 which is secured as by a pin 96 to a torque link 98, the other end of which is fastened, as by a pin 100, to a mounting bracket 102 disposed on the vehicle frame. As will appear, the ring gear 92 is held stationary and absorbs the driving torque reaction force. Additional supports for confining the ring gear 92 in stationary position (not shown in detail) may also be provided.

Disposed laterally inwardly of the ring gear 92 is a radially outer portion of a rotatable hydraulic motor frame 104. On the inner end face of the motor frame 104, and disposed for rotation therewith in a manner to be described in detail herein, is a cam ring positioner sprocket 106, driven through a chain 108 by a control motor sprocket 110. An adjustable idler sprocket 112 maintains tension on the chain. Laterally intermediate cam ring positioner drive gears 114 and laterally inner cam ring positioner gears 116 are shown to be partially visible behind the sprocket 106; the operation of these gears will be described in detail elsewhere herein.

FIG. 2 also shows the axially outer end portion 118 of a valve core 120 which is supplied by a high pressure flexible tube or hose 122 connected to an end 124 which may be fixedly attached for support to the vehicle frame and connected to the high pressure outlet line 16. The hose end to valve connection has provision for fluid sealed relative rotation therebetween.

FIG. 2 shows that the control motor sprocket 110 is driven by a stroke control hydraulic motor 76 which is supplied, as by hydraulic lines 72, with fluid from a variable displacement stroke control pump 68. The action of the pump 68 is shown to be controlled, in a manner to be described elsewhere herein, by the position of the stroke control lever 60. The position of the stroke control lever 60 may, depending upon conditions, be determined in part by the position of the yoke 51, the position of which is in turn determined by a spring-biased piston and cylinder assembly 55 having conduits 126, 128 for variable high and constant low hydraulic pressure, respectively. An operator hand control 48 is connected to the stroke control lever 60 through spring-loaded means 52 which permit overtravel or lost motion in the connection between the operator hand control 48 and the lever 60.

Figure 3:
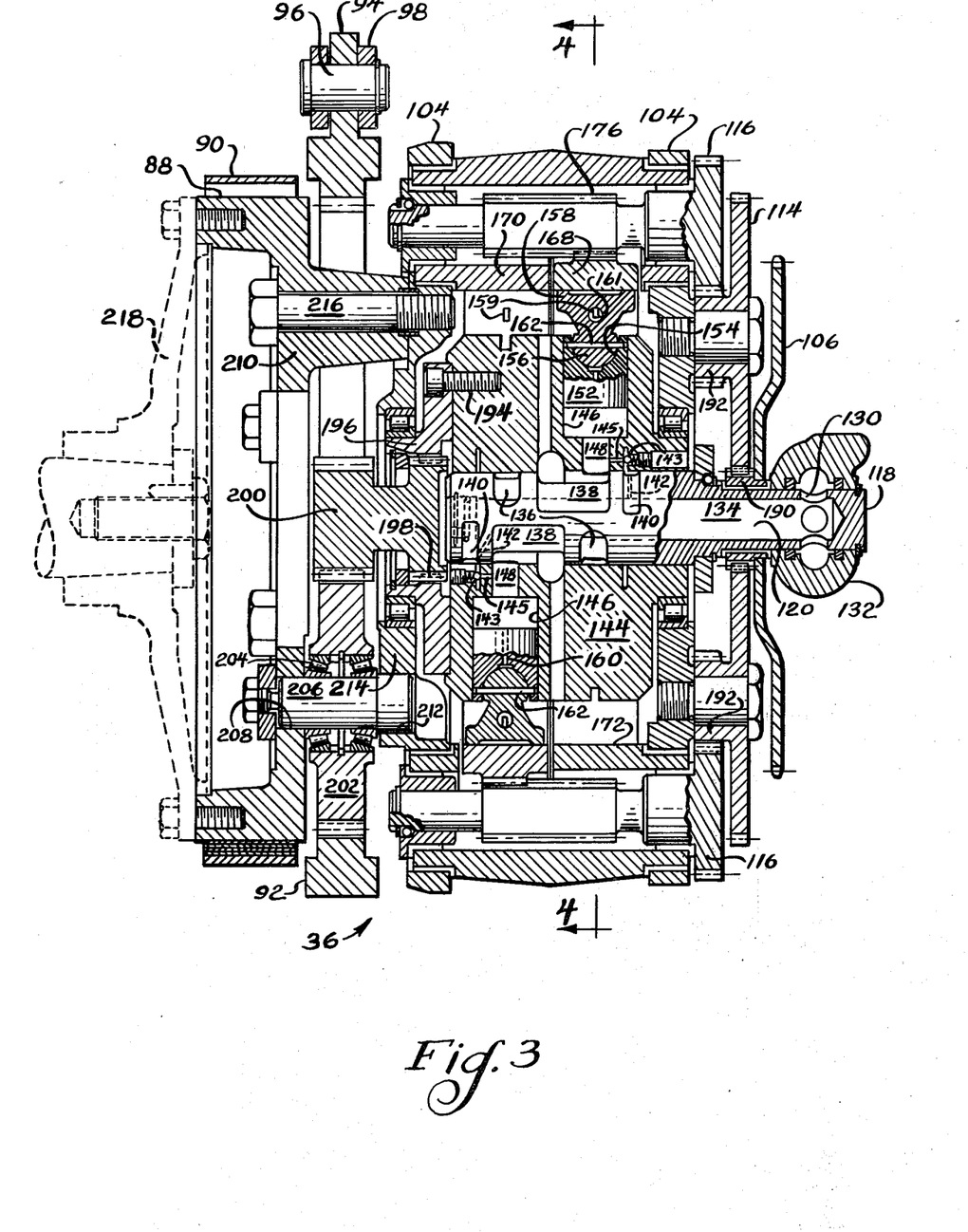
FIG. 3 is a vertical sectional view of a preferred form of hydraulic motor used in the apparatus of the invention, showing the rotatable motor frame and planetary gear drive with the torque reaction ring gear therefor, the axially extending hydraulic valve core of which the piston and cylinder assembly rotates thereabout, and further showing certain details of the cam ring positioning mechanism.
Figure 4:
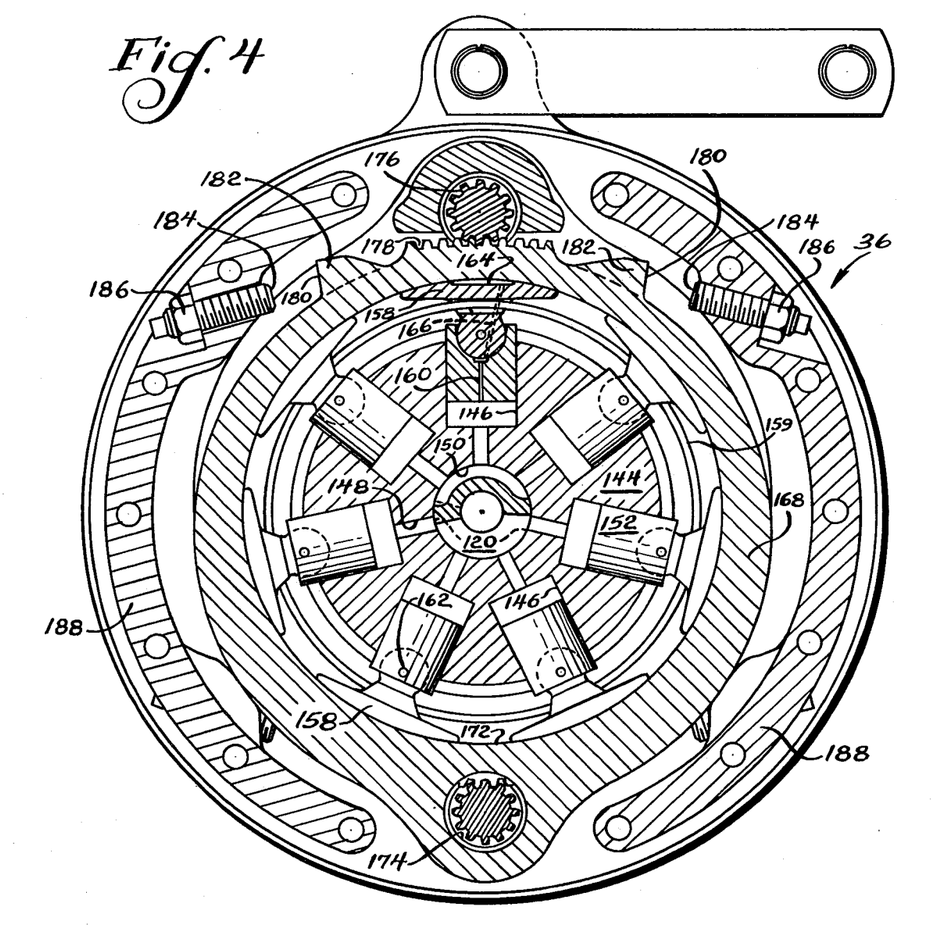
FIG. 4 is a vertical sectional view, taken along lines 4—4 of FIG. 3, also showing the hydraulic motor component of the invention, further illustrating the relation of the pistons, slipper, cylinder block and the cam ring associated therewith, and showing the cam ring concentrically disposed with respect to the cylinder and piston assembly.

Briefly summarizing the operation of the elements in FIG. 2, when the operator positions the hand control 48 forward to a predetermined extent, the stroke control lever 60 will move or tend to move to a position causing a certain rate of fluid flow from the stroke control pump 68. This flow causes the stroke control motor 76 to rotate, driving the chain 108, the sprocket 106, and the gears 114, 116 therewith. This moves the cam ring within the drive motor 36, causing the motor to rotate and propel the vehicle. Referring now in particular to FIGS. 3 and 4, certain additional details of the fluid motor generally designated 36 are shown. These elements include an axially extending, central valve core 120 having an end portion 118 with inlet passages 130 surrounded by, and in rotatable relation with, a sealed fitting 132 which is adapted for connection with the hose 122 shown in FIG. 2. The valve core 120 includes an axially extending center passage 134 having fluid connection with a pair of high pressure fluid inlet passages 136. A pair of low pressure fluid outlet passages 138 are formed in the periphery of the valve core 120. The core also includes balancing recesses 140 supplied by very small diameter passages 142 communicating with the central passage 134. The axis of the valve 120 is also the rotational axis of the motor 36.

Another major element of the fluid motor 36 is the cylinder block 144, which includes a plurality of radially extending cylinders 146, each having a radially disposed fluid inlet passage 148 extending into the bottom thereof from the axial bore 150 which receives the valve core 120. A so-called "spitter" check valve 143 is provided for each of the passages 145, to prevent trapping of fluid when the radial passages 148 pass over the valve lands between the high pressure and low pressure valve recesses.

Within each cylinder 146 is a radially acting piston 152, having a socket portion 154 in which is received a ball end portion 156 of a cam ring shoe or slipper 158. Each piston 152 includes a central oil passage 160 to lubricate the ball and socket connection just referred to. The slipper and piston assemblies are held radially outward in contact with the cam ring for initiating contact therebetween, and are kept in generally planar alignment, by the provision of spring steel aligning rings 159 extending through openings 161 in the slippers 158. One ring 159 is provided for each row of pistons.

A wrist pin 162 secures the ball 156 in place within the socket 154. A recess 164 in the face of the piston slipper 158 receives a supply of oil through a generally radially extending passage 166 in the slipper, thus permitting oil from the cylinder to lubricate the face of the slipper and to counteract to a certain extent, the radially outwardly directed force exerted by fluid pressure acting on the piston 152 against the slipper 158. The arrangement of the passages 160, 166 and their associated recesses is similar to the known arrangement of so-called rifle-drilled connecting rods in automotive and other engines, and serves a similar purpose in addition to the pressure counteracting purpose.

Disposed outwardly of the outer surfaces of the slippers 158 are a pair of annular cam rings 168, 170, one for each of the rows of pistons. Referring to FIG. 4, the cam ring 168 associated with the row of pistons shown to the right in FIG. 3 is illustrated. The cam ring 168, presents a cylindrical inner surface 172, which cooperates with the slippers 158. The ring itself 168, is pivotally mounted at one end thereof by bearing means concentric with the opening 174. Eccentric motion of the rings is achieved by rotating the cam ring positioner pinion gear 176, the teeth of which engage the teeth comprising the rack 178 on the exterior of the cam ring 168.

Figure 5:
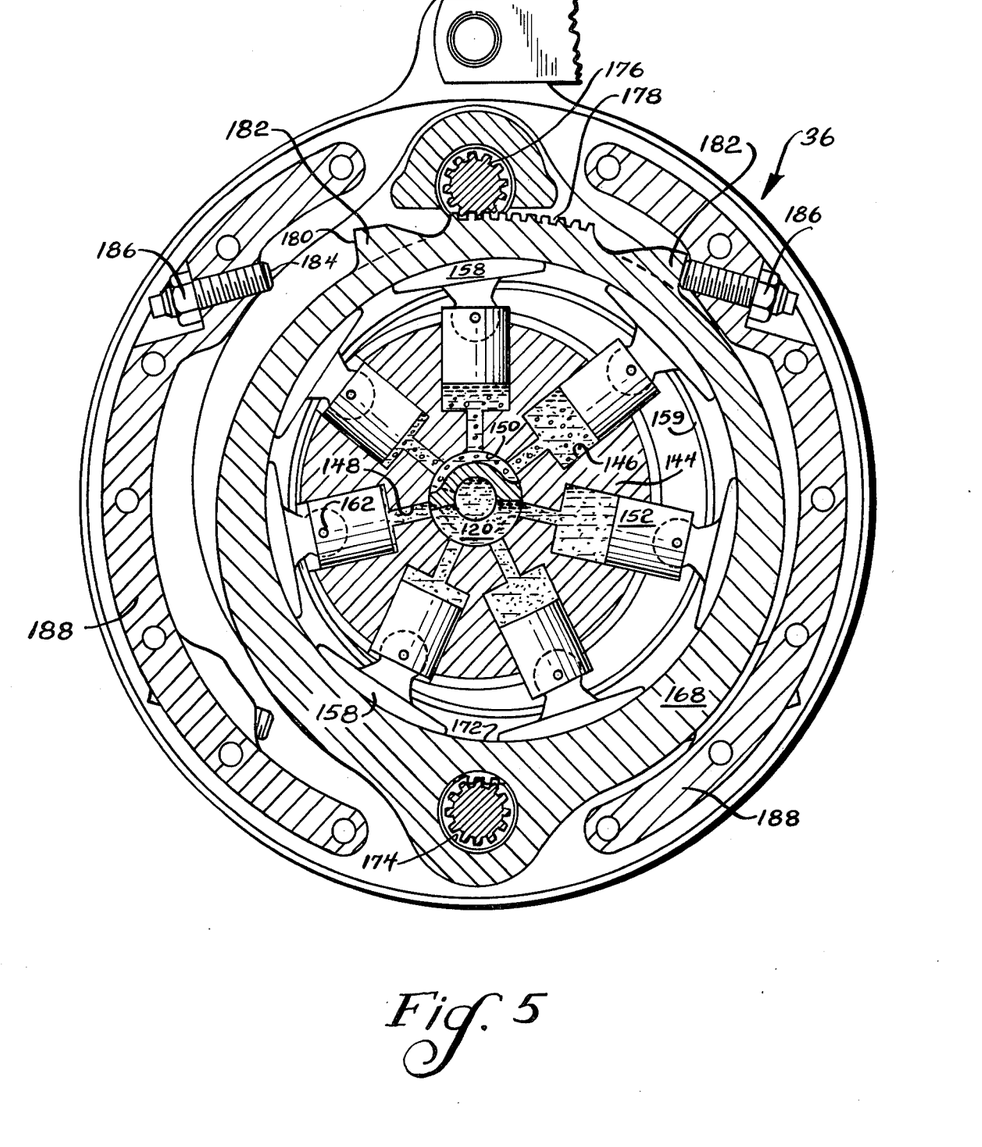
FIG. 5 is a vertical sectional view of certain portions of the motor of FIG. 4 showing the cam ring in the maximum offset or eccentric position.

FIG. 5 shows the relation of the cam ring 168 to the cylinder block 144 when the ring 168 is in the position of greatest eccentricity. One of the end faces 180 on the cam ring boss 182 engages an end face 184 on an adjustably positioned stop member 186 located in the motor frame members 188. This limits the extent to which the cam ring 186 can be eccentrically positioned. In the preferred embodiment, a cam ring is used for piston stroke control, but it is understood that a parallel piston swashplate motor or the like could be used. All such variable displacement motors may be considered as having variable output capabilities and adaptable to suitable output controls for this purpose.

Referring again to FIG. 4, it will be noted that there are right and left hand bosses 182, and faces 180, etc., thus providing symmetrical movement stops for both forward and reverse rotation of the motor 36.

Referring now to FIG. 3, it will be understood that a second or left hand cam ring 170 cooperates with the slippers 158 associated with the pistons 152 in the other row of cylinders 146. The cam ring for this row of cylinders is operated in the same manner as that of the ring 168; however, the pivot axis of the ring 170 is at the top or opposite end and the rack and pinion drive assembly is at the bottom thereof as shown in FIG. 4. It will be appreciated that the motor 36 of the invention is a twin row, 14 cylinder, double cam ring motor, and that, accordingly, two cam ring positioner mechanisms are provided, each acting in opposite directions.

Referring now to another major element of the motor 36, namely, the means for rotating the cam ring positioning pinion gear, this means comprises a drive train including axially inner cam ring positioner gears 116, axially intermediate cam ring positioner drive gears 114, and the cam ring gear positioner sprocket 106. As may be best seen in FIG. 3, the inside diameter of the sprocket 106 includes a hub 190 which includes outwardly directed teeth meshing with the teeth on the gears 114. Gears 114 also include hubs 192 with radially outwardly directed teeth adapted to engage the teeth on the outside diameter of the gears 116. Inasmuch as the sprocket 106 is driven by a small diameter countershaft gear 110, it will be appreciated that the cam ring positioning pinion gear 176 undergoes very greatly reduced angular rotation in respect to the rotation undergone by the control motor sprocket 110, which is in turn driven by the stroke control motor 76.

In a preferred form of machine, the gears are arranged such that 427° of rotation of the sprocket 106 produces only 5° rotation of the cam rings 168, 170. Furthermore, the countershaft sprocket 110 must rotate approximately 6° for every degree of movement of the sprocket 106. Overall gear reduction between the stroke control motor 76 and the cam rings 168, 170 is accordingly of the order of 500 to 1, or more.

Figure 6:
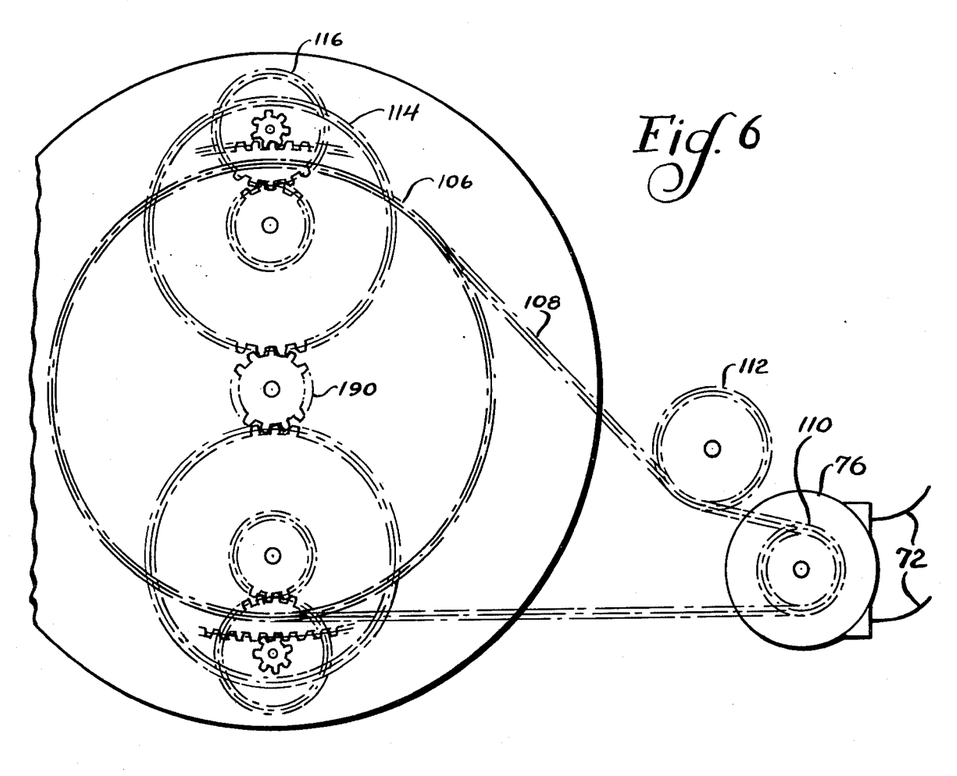
FIG. 6 is a side elevational view, with portions broken away, showing a portion of the stroke control motor which serves to position the cam ring, and further showing the drive train used to accomplish this function.

FIG. 6 shows the positions and operating relationships of the various sprockets, the chain, idler, and gear train used to maintain the desired rotational velocity of the sprocket 106, as well as the position of the stroke control motor which drives the sprocket 106.

Referring now to the other two principal components of the motor assembly 36, it will be seen that there is a direct connection, as by fasteners 194 between the cylinder block 144 and a bearing supported hub unit 196 which is splined, as at 198, to a sun gear 200. The sun gear in turn meshes with a plurality of planetary gears 202 disposed between the sun gear 200 and the ring gear 92 (see also FIG. 2). The planet gears 202 are journaled, as by a bearing assembly 204, about the axis of a shaft 206 which is received at one end thereof in an opening 208 in the planet carrier 210, and at the other end thereof in an opening 212 in the rotatably mounted end plate 214 which forms a part of the motor frame 104 of the motor 36. The planet carrier 210 is also directly fastened, by a plurality of bolts 216, to the motor frame 104 end plate 214. A final drive or companion flange 218 has secured to it for support of the motor 36, the planet carrier 210, the drum-like drive flange 88 of which is surrounded by the brake band 90.

From the foregoing description, it will be apparent that, in the use of the motor, the cylinder block may rotate rapidly, the sun gear 200 rotates rapidly and spins the planet gears 202 about their own axes. Because the pin 96 anchors the ear 94 to the torque link 98, the ring gear 92 cannot rotate. Accordingly, the planet gears 202 travel along the inside diameter of the ring gear 92, carrying with them the planet carrier 210, the frame 104 of the motor 36, and the cam rings 168, 170. As long as the sprocket 106 rotates at the same rotational rate as the motor frame, the pinion gear 176 will not rotate about its own axis, and the cam rings positioned thereby will remain fixed. Moving the sprocket 106 at a rate which is faster or slower than the rate of rotation of the motor frame will cause the cam rings 168, 170 to change position, increasing or decreasing the torque of the motor. Accordingly, the position of the cam rings is unaffected when there is synchronous motion between the sprocket 106 and the motor frame. However, when the sprocket 106 accelerates or decelerates with respect to the motor frame, the rings change position and the stroke of the pistons and the output of the motor are changed. Conversely, when the motor frame 104 accelerates or decelerates with respect to the sprocket 106 as a result of lesser or greater vehicle tractive effort demand, the rings change position and the stroke of the pistons and the output of the motor are similarly changed.

Inasmuch as it is an object of the invention to control the stroke of the pistons in a particular manner, detailed reference will now be made to the manner in which this is carried out in the practice of the invention.

Figure 7:
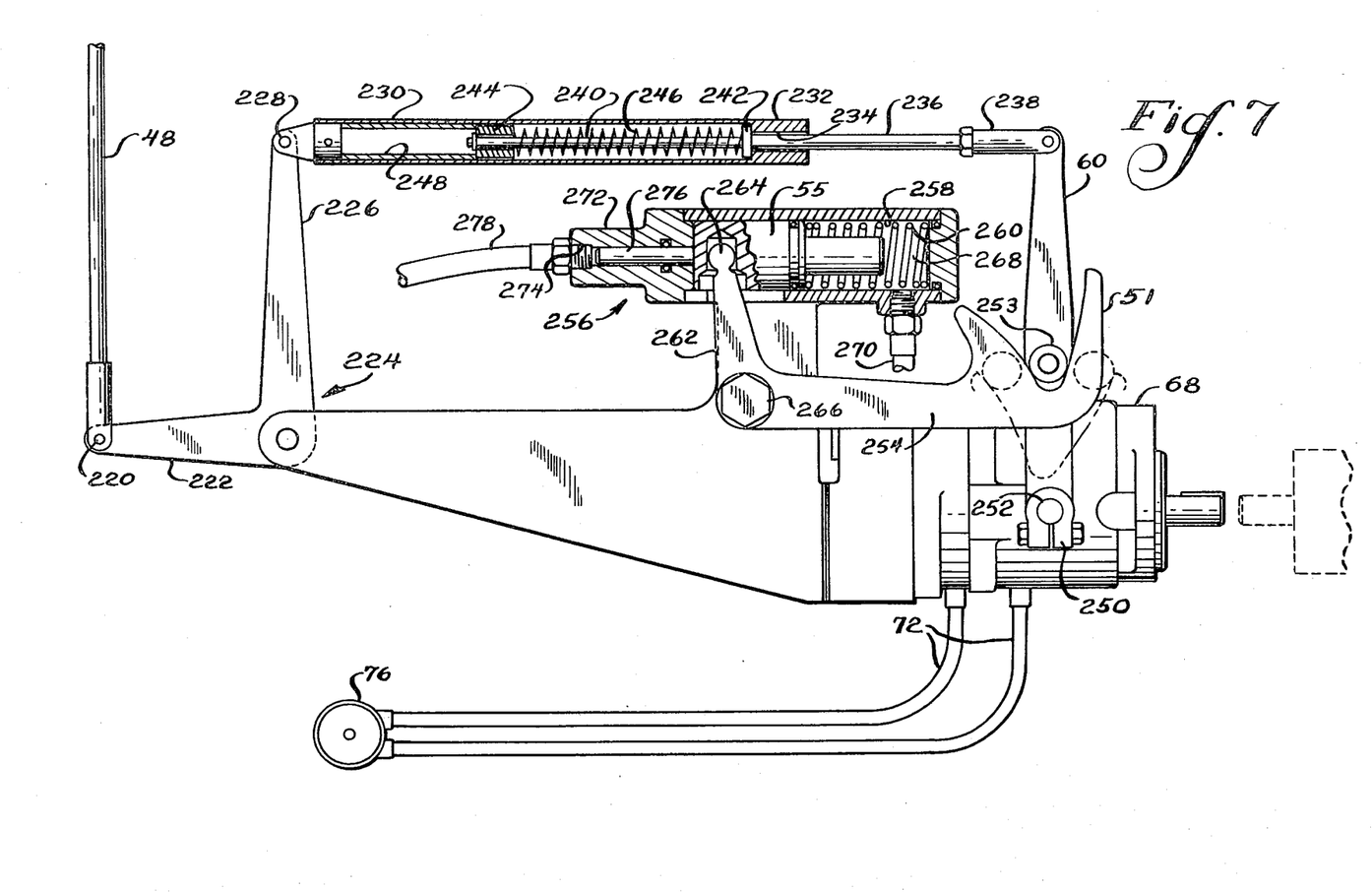
FIG. 7 is a side view, partly in elevation and partly in section, showing a portion of the stroke control pump, the stroke control motor, the stroke control pump change rate limiting mechanism and the details of the operative connection among these elements.

Referring now to FIG. 7, the details of certain parts of the motor control are shown. FIG. 7 shows a portion of an operator hand control 48, secured at a clevis 220 to one arm 222 of a bell crank assembly 224, the other end 226 of which is pivotally attached at 228 to a tube 230 having a radial end flange 232 with an opening 234 partially closing off one end thereof. An over-travel rod 236, which is secured by a clevis 238 to the stroke control lever 60, includes a reduced diameter end portion 240 containing a pair of collars 242, 244, between which a compressible coil spring 246 is disposed. A reduced diameter sleeve 248 lies within a portion of the tube 230. The shoulder formed by the outer edge of the sleeve 248 abuts the collar 244 when the spring 246 is extended.

In use, the tube 230 may move the rod 236, or the tube 230 may be moved in either direction with respect to the rod 236, provided the spring 246 is compressed. If the tube 230 is moved to the right, as viewed in FIG. 7, the reduced diameter end portion 240 of the rod 236 will extend into the interior of the sleeve 248, and if the tube is forced to the left, and the end portion 240 remains fixed, the collars 244, 242 move toward each other compressing the spring 246 therebetween. From the foregoing, it will be seen that if the hand control 48 is moved in a given direction, the rod 236 will normally follow it and position the control lever 60 accordingly; however, if the stroke control lever 60 cannot move, or if the movement thereof is partially impeded, spring forces will be present biasing the rod 236 and the lever 60 toward the position intended by the operator in positioning the control 48. This acts as a mechanical "memory" which will ultimately move the lever 60, when conditions permit. Another embodiment of control levers 48, 50 could include a drag or position lock device having position retention capability at least equal to the force of the spring 246. A joystick type control lever for manipulating the two controls could also be provided to make steering control of a steering-by-driving vehicle more convenient.

Referring now to the stroke control lever 60, the lower end thereof is shown to be securely fastened, as by a pinch bolt assembly 250, to a transversely extending shaft 252. In the preferred form of invention, the shaft 252 controls the position of the swash plate of a variable displacement hydraulic pump 68, which is shown in FIG. 1 driven by the vehicle engine 12 or it may otherwise be operated by an electric motor (not shown in detail). As is known to those skilled in the art, the change of swash plate position changes the fluid flow output rate of the pump 68. Since the stroke control motor 76 is a fixed displacement type and is attached as by hydraulic lines 72 to the pump 68, the rotational rate of the motor 76 is determined by the flow rate of the pump 68 which is in turn determined by the position of the lever 60. While a hydraulic pump and motor combination is shown as the stroke control or cam ring positioner means herein, it is anticipated that counterparts thereof may be made by those skilled in the art using electric or mechanical components.

As shown in FIG. 7, a roller 253 extends outwardly from the side of the lever 60 and is received within the tapered opening of the yoke 51. When the yoke 51 is in the position shown in the solid lines in FIG. 7, the control lever 60 cannot move, although the operator hand lever 48 can be positioned so as to place a biasing force thereon in either direction. If and when the arm 254 of the yoke 51 moves down, the roller 253 obtains gradually lessening restraint from the yoke 51, permitting correspondingly greater movement of the lever 60. If, for example, the arm 254 is in the position shown in phantom lines in FIG. 7, the lever 60 may be moved between wide limits. If the arm 254 is in the uppermost position, the lever 60 cannot move at all. If the lever 60 is biased to an intermediate position, and the yoke 51 is gradually lowered, the extent to which and the rate at which the lever 60 will be permitted to move will be gradually decontrolled.

Referring now to the stroke control pump change rate limiter assembly generally designated 256, this unit will be seen to include the piston 55, also schematically shown in FIG. 1, a cylinder 258, and a spring 260 urging the piston 55 to the left as shown in FIG. 7. An arm 262 terminating in a ball end 264 is pivoted as at 266 so that movement of the piston 55 will determine the position of the yoke 51. A low pressure chamber 268 defined by the cylinder 258 and the piston 55 is supplied with fluid under low constant pressure through a line 270 such as from the charging circuit (not shown) of the pressure compensated variable displacement pump 14. The nose portion 272 of the change rate limiter 256 includes a small diameter bore 274, which receives a free piston 276. High pressure fluid is supplied from the main hydraulic system to the end of the piston 276 through the interior of the line 278.

The effective area of the piston 55 is much larger than that of the area of the piston 276, so that in combination with the force of the spring 260 much greater pressures are required in the line 278 than in the line 270, in order for the forces urging the piston 55 to the left to be overcome. In use, for example, a pressure range of 2,700 to 3,000 psi is present in line 278; 180 psi constant pressure is furnished to the chamber 268, and the piston areas and strength of the spring 260 are selected so that, at 3,000 psi the piston 55 occupies an extreme right hand position and, at 2,700 and lower psi, it occupies the position shown. Intermediate positions of the piston 55 occur when the pressure in line 278 varies between 2,700 and 3,000 psi.

Referring now to the overall operation of the system comprised of the elements just described, it will be assumed that it is desired to operate an earthmoving tractor under a variety of conditions, and that the tractor is initially stopped and the transmission is in neutral. The operator selects an engine throttle setting and, as he advances the throttle, the engine accelerates to the desired governed operating rpm. The control levers 48, 50 are then moved to an extent which, in the judgment of the operator, represents the direction of travel and the approximate speed at which work will be done by the tractor. Before the levers are moved, since the tractor is at a standstill, no tractive effort is required, and the hydraulic system is fully pressurized by the pump 14. Pressure in the line 16 acts on the piston 276 (FIG. 7) forcing it to the right and permitting the yoke 51 to drop downwardly. When the lever 60 is free from restriction by the yoke 51, the spring 246 is not compressed and the tube 230 and rod 236 are free to move as a unit. When the control lever 48 is moved, the control lever 60 of the stroke control pump 68 moves through a substantial distance and the pump 68 then begins to feed a substantial volume of fluid to the stroke control motor 76.

Rotation of the shaft of the motor 76 actuates the sprocket 110 and the associated drive train, including sprocket 106 and gears 114, 116. This rotates the pinion gear 176, moving the cam ring within the motor frame 104. Thereupon, the tractor begins to move as soon as the resistance to movement is overcome by the torque output of the traction motors. Assuming that the movement of the lever 48 was moderate and that the tractor is not pulling a heavy load, the system pressure will remain high and the lever 60 will be permitted a fairly large range of movement. It will be understood that, as the cam rings move, the cylinder block begins rotating at once, as does the entire motor frame. The drive sprocket 106 also continues to rotate and will generally do so synchronously or with a slight lead with relation to the motor frame 104. Assuming that the vehicle speed selection is high and the position of the lever 48 requires a large movement of the lever 60 and the starting torque requirement is high requiring a larger volume of fluid than the pump 14 can produce, system supply pressure will drop, the yoke 51 will rise, and act on the roller 253 to reposition the lever 60 towards a setting which will decrease the displacement of the pump 68. This slows the motor 76, the sprocket 106 runs more slowly than the motor frame 104, and this, in turn, acts through the drive train on the pinion gear 276, moving the cam ring to a position which prevents the motor from using more fluid than is available from the system pressure source; that is, a speed-determining position which is compatible with the tractive effort required and the fluid power available from the pump 14. As system pressure is again restored, the yoke 51 will again relax its restraint on the lever 60 permitting the speed of the traction motors 36 to advance toward the operator selected speed. It is to be understood that although this maneuver is described as occurring in a step-by-step sequence, in actual operation the speed and/or torque adjustments are precisely, continuously and smoothly performed.

If the tractive effort is appropriate, the tractor will reach its desired speed with the greatest efficiency and will maintain this speed until greater or lesser tractive effort is required. If lesser tractive effort is required, the traction motors will tend to overrun the control speed and reduce traction motor fluid usage. Dynamic braking will occur as the cam ring is shifted to an over-center position by continued reduction of tractive effort into a negative condition. If more tractive effort is required, the cam ring will shift to a higher torque position and possibly a slower speed will result if insufficient volume of system fluid, at the required pressure, is available.

Inasmuch as the chamber 268 is being supplied by fluid at a low, constant pressure, only change in the high pressure system accounts for changes in the positions of the yoke. When the lever 60 cannot move to the extent indicated by movement of the lever 48, the biasing forces exerted by the spring 246 continue to act on the lever 60. This lever 60 will be moved to the setting indicated by the position of lever 48 when system pressure rises sufficiently to lower the yoke and permit the lever 60 to move. In normal use, this is accomplished in a very smooth manner. According to the invention, rapid movement of the controls will not stall the engine or generate undue heat resulting from improper control positions. The operator can position the levers 48, 50 where he wants them to be, and the system of the invention will thereafter control the vehicle movements so as to eliminate the need for constant repositioning of the levers 48, 50 or loss of efficiency because of improper traction motor setting.

Assuming that the operator wishes to use one or more of the auxiliary function circuits 18, 20, 22, and accelerate the vehicle at the same time, the closed center design of the auxiliary circuits, in combination with the response of the limiter 256, insures that full hydraulic pressure will be available on a priority basis to the auxiliary systems. If the pressure drops, the yoke 51 rises and prevents further pressure-dropping movement of the lever 60, and this maintains pressure and volume sufficient to operate the auxiliary systems under all vehicle operating conditions.

It will thus be seen that the present invention provides a novel fluid motor and control system having a number of advantages and characteristics including those pointed out above and others which are inherent in the invention. Several preferred embodiments of the invention having been described by way of illustration, it is anticipated that changes and modifications to the described form of motor and control system will occur to those skilled in the art and that such changes and modifications may be made without departing from the spirit of the invention or the scope of the appended claims.

What is claimed is:

1. A hydraulic drive and control system comprising, in combination, a hydraulic drive motor including a driven member, a hydraulic circuit including means for supplying fluid under pressure to said motor, adjustably positionable output control means associated with said motor for varying the output torque and rotational speed of said driven member, said hydraulic system being characterized in that the pressure therein will vary at least slightly in relation to variations in resistance to movement of said driven member, means for positioning said output control within a predetermined range of positions so as to enable an operator to vary said motor torque and rotational speed within a predetermined range, and means responsive to changes in pressure within said hydraulic circuit for varying said predetermined range of positions through which said positioning means may be moved, whereby said output control means is at least occasionally, in use, controlled by variations in resistance to movement of said driven member.

2. A drive and control system as defined in claim 1 wherein said drive motor includes a cylinder block with a plurality of radially disposed cylinders within said cylinder block and a piston within each cylinder.

3. A drive and control system as defined in claim 1 in which said adjustably positionable output control means includes at least one pivotally mounted cam ring unit.

4. A drive and control system as defined in claim 1 wherein said drive motor includes a cylinder block, having two axially spaced apart rows of radially extending cylinders, in which radially acting pistons are disposed within said cylinders in said cylinder block, and in which said adjustably positionable output control means incudes first and second pivotally mounted cam ring units for said first and second rows of cylinders, respectively, said cam rings being constructed and arranged such that movement in one direction of said first cam ring is accompanied by an equal movement of said second cam ring in an opposite direction.

5. A drive and control system as defined in claim 1 in which said adjustably positionable output control means includes at least one pivotally mounted cam ring unit, in which said drive motor is of the radial piston and cylinder type and which includes slippers operatively associated with and dispersed between said pistons, said slippers engaging portions of said cam ring unit, and in which said means for positioning said output control includes a reduction gear train having at least one pinion gear engaging a counterpart rack disposed on a portion of said cam ring, whereby moving said gears in said gear train causes movement of said pivotally mounted cam ring and adjustment of said motor speed and torque.

6. A drive and control system as defined in claim 1 in which said means for positioning said output control includes a variable speed drive unit, said drive unit being arranged so that said output control positioning means may be adjusted by varying the operating characteristics of said drive unit.

7. A drive and control system as defined in claim 1 in which said means for positioning said output control includes a variable displacement hydraulic pump and a fixed displacement hydraulic motor, and in which said pump includes a volume control element, said system further including an operative drive connection between said fixed displacement motor and said output control positioning means, whereby positioning said output control means is accomplished by varying the position of said volume control element.

8. A drive and control system as defined in claim 1 in which means for positioning said output control includes a variable displacement hydraulic pump and an output volume control therefor, said positioning means further including a manually positionable operating lever and a resiliently biased connection permitting overtravel between said lever and said output volume control, and in which said pressure responsive means includes means for engaging a portion of said volume control means in at least certain positions thereof, said engaging means being movable between a plurality of positions so as to permit various movement ranges of said volume control means as said engaging means is moved through said plurality of positions.

9. A drive and control system as defined in claim 1 in which said drive motor is a variable displacement, radial piston motor, in which said output control means includes a movable cam ring forming a part of said motor, in which said positioning means for said output control includes a cooperating fluid pump and motor assembly, said positioning means for said output control further including a movable element controlling the output rate of said fluid pump, said pressure responsive means being operatively associated with said movable element.

10. A drive and control system as defined in claim 1 in which said drive motor is a radial piston motor which includes a movable cam ring, wherein movement of said cam ring serves to change the stroke of said pistons and thereby change the output torque of said motor, wherein said output control means includes means for moving said cam ring, and in which said positioning means includes a stroke control arrangement comprising a fluid pump, a motor, and means for controlling the volume output of said pump, a drive connection between said motor and said cam positioner, and wherein said pressure responsive means includes a hydraulic cylinder and means for mechanically engaging said volume controlling means on said fluid pump to limit the movement thereof in response to predetermined changes in said fluid pressure.

11. A drive and control system as defined in claim 3 in which said adjustably positionable output control means includes at least one pivotally mounted cam ring, and in which a gear drive is provided for moving said cam ring unit, said gear drive including a rack portion on said cam ring and pinion gear having portions normally engaging a portion of said rack, and reduction gearing between said pinion gear and said pressure responsive means.

12. A drive and control system as defined in claim 8 in which said resiliently biased overtravel connection comprises a mechanical link having a tubular portion and a rod disposed within at least a portion of said tube, with a spring being disposed within said tube and having a part affixed to said rod, said spring permitting relative movement, under certain conditions, between said tube and said rod, said spring also being adapted to bias said tube and rod into a predetermined position with respect to each other.

13. A drive and control system as defined in claim 1 in which said means for positioning said output control includes a variable displacement hydraulic pump and a fixed displacement hydraulic motor, and in which said pump includes a volume control element, said system further including an operative drive connection between said fixed displacement motor and said adjustably positionable output control means, whereby positioning said output control means is accomplished by varying the position of said volume control element, said operative drive connection comprising a gear train associated with a portion of said motor and having one gear thereof engaging a portion of said output control means, a sprocket engaged with another of said gears in driving relation, a sprocket disposed on said fixed displacement motor, and a chain trained around said sprockets to provide a positive operative drive connection therebetween.

14. A hydraulic drive and control system as defined in claim 1 in which said hydraulic drive motor includes a central valve with a stem portion disposed within said motor, said valve having an inlet passage for fluid under pressure and a plurality of passages within the body of said spool, a double row cylinder block surrounding at least a portion of said valve stem, a plurality of radially disposed cylinders within said cylinder block, each of said cylinders including passages for directing fluid under pressure from said valve into each of said cylinders, radially acting pistons disposed within said cylinders, a slipper associated with each piston, a cam ring for each of said rows of cylinders, each of said cam rings including a pivot point, a generally cylindrical inner surface having portions adapted to engage said slippers, and a surface spaced from said pivot point which includes a toothed rack portion, and a pinion gear engaging said rack, said pinion gear forming a part of said means for positioning said output control.

15. A fluid motor and control system for use as a vehicle drive, said system comprising, in combination, a variable displacement fluid traction motor which includes a cylinder block and a plurality of pistons received for reciprocating movement therein, and means for controlling the stroke of said pistons to change the torque and rotational speed output of said traction motor, a hydraulic drive circuit including means for supplying fluid under pressure to drive said traction motor, said stroke control means including a variable speed stroke control drive assembly having a drive control element movable through a range of positions, a manually positionable operator control lever and an operative connection between said drive control element and said lever, and means for limiting the rate and extent of movement of said drive control element in response to changes in fluid pressure within said hydraulic drive circuit.

16. A system as defined in claim 15 in which said operative connection between said drive control element and said lever includes resilient means adapted to bias said drive control element to a position corresponding to the position of said operator control lever, whereby said control element will be urged toward said position in opposition to the forces applied thereto by said means for limiting the rate and extent of movement thereof.

17. A system as defined in claim 15 in which said variable speed stroke control drive assembly includes a variable displacement pump and a fixed displacement motor operatively associated therewith, said drive control element comprising the displacement control for said variable displacement pump.

18. A system as defined in claim 15 in which said traction motor is mounted for rotation, in which the means for controlling the stroke of said traction motor includes a pinion gear for moving a cam ring forming a part of said traction motor, wherein said pinion gear is mounted for rotation with said traction motor, said pinion gear being also mounted for rotation about its own axis, and where said stroke control means includes means having a portion engaged with said pinion gear and being adapted to rotate synchronously with said traction motor in order to avoid rotation of said pinion gear and being further adapted to rotate faster or slower than said motor so as to rotate said pinion gear about its own axis and thereby vary said traction motor stroke.

19. A system as defined in claim 15 in which said limiting means includes a hydraulic piston and cylinder assembly associated with said hydraulic circuit, said limiting means further including a yoke for embracing a portion of said drive control element with a degree of confinement which varies with respect to the position of said piston.

20. A fluid motor and control system as defined in claim 15 in which said means for limiting the rate and extent of movement of said drive control element includes a yoke for embracing a portion of said drive control element, and a drive for said yoke, said yoke drive including a hydraulic piston and cylinder arrangement, said piston and cylinder arrangement including means biasing said piston toward one end of said cylinder and means for permitting passage of hydraulic fluid from said hydraulic circuit under pressure to the opposite end of said piston whereby said piston may move through a range of positions as determined by the force of said biasing means in relation to the force created by the hydraulic pressure present in the circuit from time to time.

21. A control system as defined in claim 15 in which said limiting means includes a hydraulic piston and cylinder assembly, said piston and cylinder assembly including means for receiving high pressure oil at one end thereof, means for receiving lower pressure oil at the other end thereof, spring means in said other end biasing said piston toward said one end of said cylinder, a yoke element including a bifurcated portion on one end thereof, a pivot for said yoke, with the other end portion of said yoke being connected to a portion of said piston in said cyliner, said operative connection between said operator control lever and said drive control element including first and second portions arranged with respect to each other so as to permit lost motion therebetween, means for biasing said first and second portions into a predetermined position, said drive control element being in the form of a lever having a portion receivable within and engagable by said bifurcated portion of said yoke in at least certain positions of said lever.

22. A vehicle transmission including a traction motor assembly, a variable displacement, pressure compensated pump unit and a hydraulic circuit connecting said pump and motor, said motor further including a piston and cylinder assembly mounted for rotation, a frame driven by said piston and cylinder assembly and pivotally mounting at least one movable cam ring, a cam ring positioner including a pinion gear portion received in said frame and adapted to rotate therewith without movement of said ring and to rotate about its own axis to shift said ring toward and away from positions of increased eccentricity with respect to said piston and cylinder assembly, a drive train for said pinion gear, said drive train including an element adapted to rotate synchronously with said frame, and being further adapted to rotate more or less rapidly than said frame, said more or less rapid rotations causing movement of said pinion gear and cam ring, and means for rotating said drive train, said means for rotating said drive train comprising means for adjusting said drive speed within a range of positions in response to the control of an operator, and means responsive to fluid pressure in said hydraulic circuit for limiting the rate and extent of movement of said drive speed adjusting means.

23. A vehicle transmission as defined in claim 22 in which said piston and cylinder assembly comprises a double row cylinder block having pistons disposed within each of the cylinders in said block, said pistons being arranged for reciprocation radially of said cylinder block.

24. A vehicle transmission as defined in claim 22 in which said piston and cylinder assembly comprises a twin row cylinder block and reciprocable, radially acting pistons disposed within said cylinders and in which one movable cam ring is provided for each of said rows of cylinders.

25. A vehicle transmission as defined in claim 22 in which said drive train for said pinion gear comprises a plurality of gears including an input gear and an output gear, arranged in a reduction gear train, whereby a given angular motion of said means for rotating said drive train creates a relatively large angular rotation of said input gear and a greatly reduced angular rotation of said output gear, whereby said pinion gear moves only slightly about its own axis.

26. A vehicle transmission as defined in claim 22 in which said variable speed drive includes a variable displacement pump and a positive displacement motor, said variable speed drive thereby comprising a variable speed, controllable hydraulic circuit.

* * * * *